(12) United States Patent
Sabato

(10) Patent No.: US 10,212,396 B2
(45) Date of Patent: Feb. 19, 2019

(54) REMOTE TRACKING OF OBJECTS

(71) Applicant: ISRAEL AEROSPACE INDUSTRIES LTD, Lod (IL)

(72) Inventor: Moshe Sabato, Yishuv Hashmonayim (IL)

(73) Assignee: ISRAEL AEROSPACE INDUSTRIES LTD, Lod (IL)

( * ) Notice: Subject to any disclaimer, the term of this patent is extended or adjusted under 35 U.S.C. 154(b) by 0 days.

(21) Appl. No.: 14/760,986

(22) PCT Filed: Jan. 14, 2014

(86) PCT No.: PCT/IL2014/050034
§ 371 (c)(1),
(2) Date: Jul. 14, 2015

(87) PCT Pub. No.: WO2014/111923
PCT Pub. Date: Jul. 24, 2014

(65) Prior Publication Data
US 2015/0341602 A1   Nov. 26, 2015

(30) Foreign Application Priority Data

Jan. 15, 2013  (IL) .......................................... 224368

(51) Int. Cl.
*H04N 7/18* (2006.01)
*H04N 5/232* (2006.01)
*G06T 7/246* (2017.01)

(52) U.S. Cl.
CPC ............. *H04N 7/183* (2013.01); *G06T 7/246* (2017.01); *H04N 5/23216* (2013.01);
(Continued)

(58) Field of Classification Search
CPC .......................... H04N 5/23216; H04N 7/183
See application file for complete search history.

(56) References Cited

U.S. PATENT DOCUMENTS

| 4,162,775 A | 7/1979 | Voles |
| 4,405,940 A | 9/1983 | Woolfson et al. |

(Continued)

FOREIGN PATENT DOCUMENTS

| EP | 0423984 | 10/1990 |
| EP | 0606173 | 1/1994 |

(Continued)

OTHER PUBLICATIONS

Nummiaro et al., "An adaptive color-based particle filter", Image and Vision Computing (2002) 1-12.

*Primary Examiner* — Tung T Vo
(74) *Attorney, Agent, or Firm* — Dorsey & Whitney LLP

(57) ABSTRACT

The presently disclosed subject matter includes tracking method and system wherein a succession images is generated at a sensing unit; one or more moving object in the succession of images is identified; an object tag is assigned to at least one of the moving objects to yield in a respective tagged object; responsive to a command received from a control unit indicative of a selected object, identifying a location of the selected object in a latest available captured image, wherein: if the selected object is a moving object, the selected object is identified in the latest available captured image based on a respective object tag; and if the selected object is a stationary object, the selected object is identified using an image or piece thereof comprising the at least one selected object.

24 Claims, 6 Drawing Sheets

(52) U.S. Cl.
CPC ............... *G06T 2207/10016* (2013.01); *G06T 2207/10032* (2013.01); *G06T 2207/20104* (2013.01); *G06T 2207/30232* (2013.01)

(56) References Cited

U.S. PATENT DOCUMENTS

| | | | |
|---|---|---|---|
| 4,405,943 A | 9/1983 | Kanaly | |
| 4,409,661 A | 10/1983 | Romanski | |
| 4,537,370 A | 8/1985 | Pizzurro | |
| 4,661,849 A | 4/1987 | Hinman | |
| 4,682,225 A | 7/1987 | Graham | |
| 4,710,813 A | 12/1987 | Wallis et al. | |
| 4,739,401 A | 4/1988 | Sacks et al. | |
| 4,805,018 A | 2/1989 | Nishimura et al. | |
| 4,843,568 A | 6/1989 | Krueger et al. | |
| 4,855,822 A | 8/1989 | Narendra et al. | |
| 4,868,871 A | 9/1989 | Watson, III | |
| 4,898,341 A | 2/1990 | Terzian | |
| 4,925,274 A | 5/1990 | James et al. | |
| 4,959,714 A | 9/1990 | Lo et al. | |
| 4,975,960 A | 12/1990 | Petajan | |
| 4,996,592 A | 2/1991 | Yoshida | |
| 5,036,474 A | 7/1991 | Bhanu et al. | |
| 5,062,056 A | 10/1991 | Lo et al. | |
| 5,103,484 A | 4/1992 | Stafford et al. | |
| 5,119,190 A | 6/1992 | Lemelson | |
| 5,149,980 A | 9/1992 | Ertel et al. | |
| 5,155,683 A | 10/1992 | Rahim | |
| 5,216,408 A | 6/1993 | Shirakawa | |
| 5,275,354 A | 1/1994 | Minor et al. | |
| 5,280,530 A | 1/1994 | Trew et al. | |
| 5,317,319 A | 5/1994 | Fagarasan et al. | |
| 5,323,470 A | 6/1994 | Kara et al. | |
| 5,340,309 A | 8/1994 | Robertson | |
| 5,341,143 A | 8/1994 | Reis et al. | |
| 5,355,325 A | 10/1994 | Uhlmann | |
| 5,365,236 A | 11/1994 | Fagarasan et al. | |
| 5,371,536 A | 12/1994 | Yamaguchi | |
| 5,390,133 A | 2/1995 | Sohie | |
| 5,392,225 A | 2/1995 | Ward | |
| 5,406,328 A | 4/1995 | Chodos et al. | |
| 5,422,829 A | 6/1995 | Pollock | |
| 5,424,823 A | 6/1995 | Nettles et al. | |
| 5,434,617 A | 7/1995 | Bianchi | |
| 5,450,503 A | 9/1995 | Ogino et al. | |
| 5,489,099 A | 2/1996 | Rankin et al. | |
| 5,557,685 A | 9/1996 | Schlossers et al. | |
| 5,564,650 A | 10/1996 | Tucker et al. | |
| 5,574,498 A | 11/1996 | Sakamoto et al. | |
| 5,602,760 A | 2/1997 | Chacon et al. | |
| 5,626,311 A | 5/1997 | Smith et al. | |
| 5,647,015 A | 7/1997 | Choate et al. | |
| 5,714,999 A | 2/1998 | Jeong et al. | |
| 5,761,326 A | 6/1998 | Brady et al. | |
| 5,785,275 A | 7/1998 | Hiebl | |
| 5,870,486 A | 2/1999 | Choate et al. | |
| 5,940,830 A | 8/1999 | Ochitani | |
| 5,949,481 A | 9/1999 | Skine et al. | |
| 5,990,822 A | 11/1999 | Honigsbaum | |
| 6,037,936 A | 3/2000 | Ellenby et al. | |
| 6,044,166 A | 3/2000 | Bassman et al. | |
| 6,061,055 A | 5/2000 | Marks | |
| 6,064,332 A | 5/2000 | Cloutier | |
| 6,079,682 A | 6/2000 | Olkkola | |
| 6,088,060 A | 7/2000 | Suda et al. | |
| 6,122,405 A | 9/2000 | Khani | |
| 6,154,559 A | 11/2000 | Beardsley | |
| 6,199,471 B1 | 3/2001 | Perruzzi et al. | |
| 6,208,758 B1 | 3/2001 | Ono et al. | |
| 6,271,752 B1 | 8/2001 | Vaios | |
| 6,272,484 B1 | 8/2001 | Martin et al. | |
| 6,404,937 B1 | 6/2002 | Agata et al. | |
| 6,445,832 B1 | 9/2002 | Lee et al. | |
| 6,449,019 B1 | 9/2002 | Fincher et al. | |
| 6,507,366 B1 | 1/2003 | Lee | |
| 6,515,689 B1 | 2/2003 | Terashima | |
| 6,624,846 B1 | 9/2003 | Lassiter | |
| 6,672,535 B2 | 1/2004 | Brunner, Jr. et al. | |
| 6,681,061 B2 | 1/2004 | Agata et al. | |
| 6,724,915 B1 | 4/2004 | Toklu et al. | |
| 6,728,404 B1 | 4/2004 | Ono et al. | |
| 6,757,328 B1 | 6/2004 | Huang et al. | |
| 6,778,171 B1 | 8/2004 | Kikinis | |
| 6,822,676 B1 | 11/2004 | Kurosawa et al. | |
| 6,840,627 B2 | 1/2005 | Olbrich | |
| 7,184,574 B1 | 2/2007 | Zahavi | |
| 7,312,766 B1 | 12/2007 | Edwards | |
| 7,362,352 B2 | 4/2008 | Ueyama | |
| 7,454,067 B1 | 11/2008 | Pati | |
| 7,620,483 B2 | 11/2009 | Florentin et al. | |
| 7,643,064 B1 | 1/2010 | Jouppi | |
| 7,761,173 B2 | 7/2010 | Ehrlich | |
| 7,860,276 B2 | 12/2010 | Anai et al. | |
| 2002/0030741 A1* | 3/2002 | Broemmelsiek | G01S 3/7864 348/169 |
| 2002/0037770 A1 | 3/2002 | Paul et al. | |
| 2002/0054211 A1* | 5/2002 | Edelson | G06T 7/20 348/169 |
| 2002/0080159 A1 | 6/2002 | Montgomery et al. | |
| 2002/0140813 A1 | 10/2002 | Trajkovic et al. | |
| 2002/0140814 A1 | 10/2002 | Cohen-Solal et al. | |
| 2002/0168091 A1 | 11/2002 | Trajkovic | |
| 2002/0180878 A1 | 12/2002 | Iida et al. | |
| 2002/0186221 A1 | 12/2002 | Bell | |
| 2003/0035051 A1 | 2/2003 | Cho et al. | |
| 2003/0051597 A1 | 3/2003 | O'Dwyer | |
| 2004/0156561 A1 | 8/2004 | Yu-Chuan et al. | |
| 2005/0004759 A1 | 1/2005 | Siegel | |
| 2005/0012817 A1* | 1/2005 | Hampapur | H04N 7/181 348/143 |
| 2005/0077469 A1 | 4/2005 | Kaushal | |
| 2005/0119801 A1 | 6/2005 | Florentin et al. | |
| 2006/0056056 A1* | 3/2006 | Ahiska | G08B 13/19608 359/690 |
| 2006/0227862 A1* | 10/2006 | Campbell | G06K 9/00778 375/240 |
| 2006/0262365 A1 | 11/2006 | Imao | |
| 2007/0197229 A1* | 8/2007 | Kalliola | G01S 3/46 455/456.1 |
| 2007/0296814 A1* | 12/2007 | Cooper | H04N 19/503 348/143 |
| 2008/0252722 A1* | 10/2008 | Wang | G06K 9/00771 348/143 |
| 2008/0267451 A1* | 10/2008 | Karazi | G01S 5/16 382/103 |
| 2009/0129631 A1 | 5/2009 | Faure et al. | |
| 2010/0149332 A1* | 6/2010 | Wang | H04N 5/232 348/143 |
| 2010/0328443 A1* | 12/2010 | Lynam | G06F 19/327 348/77 |
| 2011/0026774 A1 | 2/2011 | Flohr et al. | |
| 2011/0130114 A1 | 6/2011 | Boudville | |
| 2011/0310219 A1* | 12/2011 | Kim | G08B 13/19643 348/36 |
| 2012/0019660 A1 | 1/2012 | Golan et al. | |
| 2012/0062732 A1* | 3/2012 | Marman | H04N 7/18 348/142 |
| 2012/0169882 A1* | 7/2012 | Millar | G08B 13/19608 348/159 |
| 2015/0378000 A1* | 12/2015 | Bar David | G01S 3/7864 348/169 |

FOREIGN PATENT DOCUMENTS

| | | |
|---|---|---|
| EP | 2117225 | 2/2008 |
| EP | 2757771 | 7/2014 |
| IL | 147370 | 6/2007 |
| IL | 134206 | 7/2007 |
| IL | 169345 | 6/2012 |
| IL | 169346 | 6/2012 |
| IL | 169347 | 6/2012 |
| WO | WO 00/046985 | 11/1999 |

(56) References Cited

FOREIGN PATENT DOCUMENTS

| | | |
|---|---|---|
| WO | WO 99/060335 | 8/2000 |
| WO | WO2010081190 | 7/2010 |
| WO | 2012/010887 | 1/2012 |

* cited by examiner

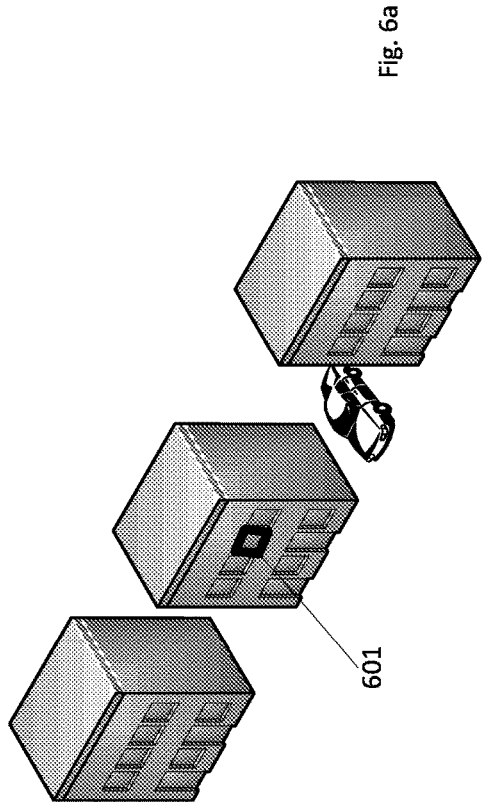
Fig. 6a
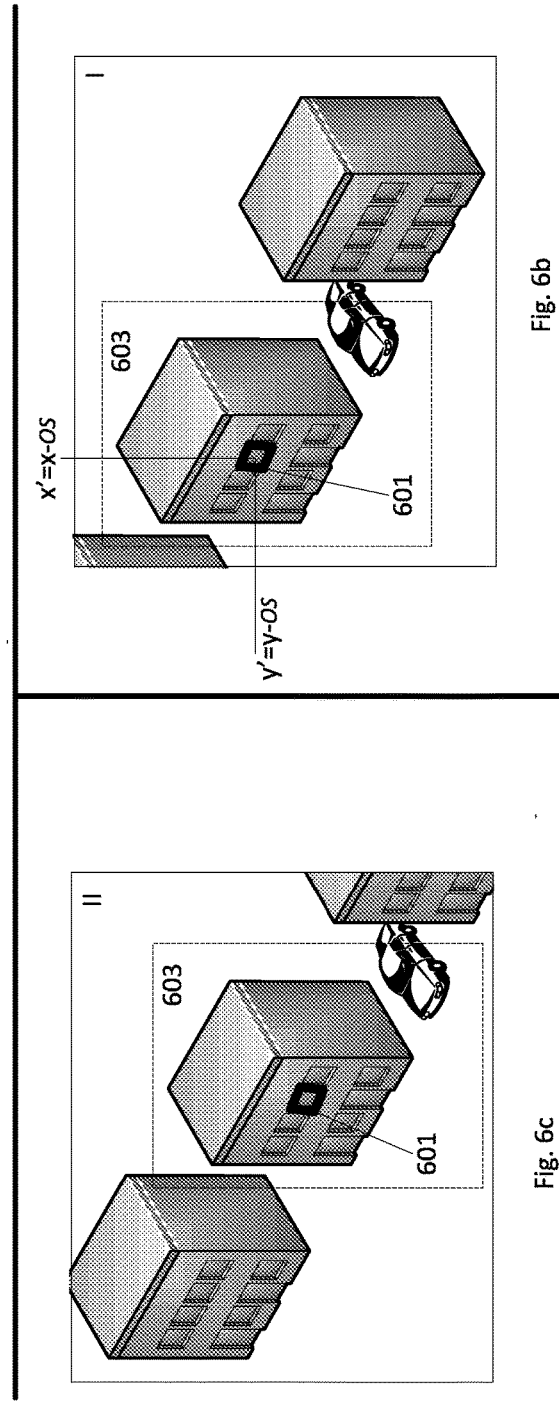
Fig. 6b
Fig. 6c

REMOTE TRACKING OF OBJECTS

FIELD OF THE PRESENTLY DISCLOSED SUBJECT MATTER

The presently disclosed subject matter relates to the remote tracking of objects by a sensing device.

BACKGROUND

In many applications, an operator of a system for surveillance and remote tracking of objects controls a remote image sensor via a communication link. Examples are traffic control, border control, search and rescue operations, land surveys, police surveillance, military applications, etc.

In general, a system for surveillance and remote tracking of objects comprises a control unit at one end and a remote sensing unit at the other end which communicate over a communication link. The sensing unit, with the help of an image sensor, can be used for surveying a scene including one or more objects, and transmitting sensing-data, which includes data that was acquired by the sensing unit or data generated by the sensing unit in relation to the acquired data (e.g. captured images, object-data characterizing identified objects in the captured images etc.), to the control unit where the images can be displayed on a display for viewing by an operator. Furthermore, the sensing unit can be configured to locate and track a sighted object. The control unit provides to the sensing unit control data, including for example, different types of commands, such as lock and/or track commands, zoom commands, centering commands, etc.

According to one possible scenario, in case an operator of the control unit decides that it is desirable to track an object in the surveyed scene, he initiates a sequence of operations directed for that purpose. The operator can first send command including pointing instructions (i.e. a type of control data) to the sensing unit which identifies the object that should be tracked. The pointing instructions can include for example, "move up", "move right", "zoom" or similar instructions. In response, the sensing unit acts upon these instructions, and directs the image sensor towards the required area.

The operator can send additional control data including for example a lock command instructing the sensing unit to lock on a desired object. In response, the sensing unit receives the instructions and attempts to lock onto the object indicated in the command.

Once the object has been locked, sensing unit takes over command and commences to operate in response to tracking instructions, which are generated within the sensing unit and are directed for tracking the locked object. The tracking instructions are forwarded to the image sensor which in turn tracks the moving object and keeps the object in the center of FOV of the display, even while the object moves relative to the sensing unit.

In many applications, there is a time-delay between the time when the sensing unit acquires an image of an object, to when the image is displayed on the display located at the control unit, and further to the time the corresponding instructions are received at the sensing unit. Factors that can contribute to the delay include for example, signal processing, image compression/decompression, duration of the communication, and/or link bandwidth limitations. Consequently, when taking into account the delayed reaction time of the operator, the accumulated delayed time can be from fractions of a second to several seconds.

Due to this time-delay, the location of the object as displayed on the display at the control unit is generally not the current location of the object. The location displayed on the display is the location of the object before the transfer of the sensing-data from the sensing unit to the control unit (e.g. x seconds ago). Additionally, by the time the sensing unit receives the control data from the control unit and generates the instruction for the image sensor, an additional time-delay occurs, (e.g. an additional y seconds). Consequently, by the time image sensor is instructed to locate the object, the object may no longer be in the same location it was when the image picture was taken over x+y seconds ago. This may result from the motion of a mobile object, from the motion of the image sensor device or from a combination of these two factors.

Clearly, this time-delay complicates the efforts to lock onto the object. The operator has to accurately calculate and estimate the expected location of the object at a time in the future when the instructions arrive at the sensing unit. Only then is the sensing unit directed to the calculated estimated location, and a lock and tracking operation can be initiated.

If the calculation of the estimated location is not sufficiently accurate, the sensing unit will lock onto some other background object in which case the entire estimation, calculation and lock process has to be repeated. As such, the effect is a continuous feedback control loop with delay, a situation which is liable to suffer from overshoots and instability.

When a human operator inputs the lock and/or track commands the process becomes further complicated. Humans do not function well in feedback loops with time-delay and their reactions and directions are less precise than, for example, computer or processor generated instructions.

Publications considered to be relevant as background to the presently disclosed subject matter are listed below. Acknowledgement of the references herein is not to be inferred as meaning that these are in any way relevant to the patentability of the presently disclosed subject matter.

U.S. Pat. No. 7,184,574 discloses a tracking apparatus including a sensor tracker and a control tracker. The sensor tracker is connected to a sensor which senses a scene having at least one object therein, the sensor tracker provides sensor movement instructions to the sensor, enabling it to track a selected object. The control tracker is located remotely from and communicates with the sensor tracker. Additionally, the control tracker takes measurements regarding the selected object and provides tracking instructions to the sensor tracker. The sensor tracker then utilizes the tracking instructions to adjust the sensor movement instructions, when necessary.

US Patent Publication No. 2008267451 discloses a method for tracking an object that is embedded within images of a scene, including: in a sensor unit that includes a movable sensor, generating, storing and transmitting over a communication link a succession of images of a scene. In a remote control unit, the succession of images is received. Also disclosed is receiving a user command for selecting an object of interest in a given image of the received succession of images and determining object-data associated with the object and transmitting through the link to the sensor unit the object-data. In the sensor unit, the given image of the stored succession of images and the object of interest using the object-data are identified, and the object in the other image of the stored succession of images is tracked. The other image is later than the given image. In case the object cannot be located in the latest image of the stored succession of images, information of images in which the object was located are used to predict estimated real-time location of the object, and direction command is generated to the movable sensor for generating real-time image of the scene and locking on the object.

EP Patent No. 0423984 discloses a synergistic tracker system which includes both a correlation tracker and an object tracker for processing sensing-data input and for generating tracking error signals. The operation of the synergistic tracker system is controlled by a central processing unit. The system operates by first correlating a reference region image with a portion of a current digitized image provided by analog to digital converter. Secondly, the object tracker provides a precisely defined track point for an object within the current image. The correlation tracker stabilizes and limits the portion of the digitized image that the object tracker must operate upon. Stabilizing and limiting this portion of the digitized image reduces the object tracker's sensitivity to background clutter and sensitivity to a loss of lock induced by sensor motion. The object tracker provides a non-recursive update for the correlation's reference region image. The correlation tracker and the object tracker are used simultaneously and cooperatively so that the strengths of one tracker are used to overcome the weaknesses of the other. This invention provides a greater tracking tenacity, a reduction in tracker angle noise, and a reduction in hardware complexity.

U.S. Pat. No. 7,620,483 relates to a method for guiding from a remote control unit a vehicle towards a target object, said remote control unit communicating with the vehicle by means of a lagged communication channel, comprising: At the vehicle: (a) Periodically capturing frame images by a camera, assigning to each of said captured frames an associated unique time stamp, and saving within a storage at the vehicle full frame data or partial frame data of captured frames and their associated time stamps; (b) For a plurality of saved frames, sending to the control unit via the lagged communication channel full frame data, partial frame data or a combination thereof with the corresponding associated time stamp for each sent frame so that approximate or exact version of the sent frames can be reconstructed and displayed at the control unit; At the control unit: (c) Receiving said frame data and associated time stamps, sequentially reconstructing frame images from each said sent full and/or partial frame data, and displaying the reconstructed images on a display; (d) Upon marking by an operator at the control unit a point on a specific displayed frame, sending coordinates indication relating to said marked point as appearing on said specific frame or on a reference frame available at the control unit, and the time stamp associated with said specific or reference frame, as is the case, to the vehicle; At the vehicle: (e) Receiving said coordinates indication as marked and the sent frame time stamp; (f) Given the coordinates indication and frame time stamp as received, fast forward tracing said point or object coordinates from the said frame towards the most recently available captured frame, thereby finding the coordinates of the same point or object as appearing in the most recently available captured frame; and (g) Providing the coordinates of the target point or object within the most recently available captured frame, as found, to an inner guidance sub-system of the vehicle, for enabling it to track said object.

General Description

According to one aspect of the presently disclosed subject matter there is provided a tracking system comprising:

a sensing unit comprising an image sensor, the sensing unit configured to communicate over a communication link with a control unit, configured to capture two or more images of a scene and to generate a succession of images; wherein the sensing unit is configured to identify one or more moving objects in the succession of images; to assign an object-tag to at least one of the moving objects to yield in a respective tagged object to be sent to the control unit;

wherein the sensing unit is further configured, responsive to a command received from the control unit indicative of at least one selected object, to identify a location of the selected object in a latest available captured image, the identification comprising:

determining whether the at least one selected object is a moving object or a stationary object;

in case the at least one selected object is a moving object, obtaining from the received command an object tag corresponding to the at least one selected object, and identifying the at least one selected object in the latest available captured image;

in case the at least one selected object is a stationary object, obtaining from the received command an image or piece thereof comprising the at least one selected object and identifying the at least one selected object in the latest available captured image.

According to another aspect of the presently disclosed subject matter there is provided a method of tracking objects, the method comprising: in a sensing unit comprising an image sensor: capturing two or more images of a scene and generating a succession of images; identifying one or more moving objects in the succession of images; assigning an object-tag to at least one of the moving objects to yield in a respective tagged object to be sent to a control unit communicating with the sensing unit; identifying, responsive to a command received from the control unit indicative of at least one selected object, a location of the selected object in a latest available captured image, the identification comprising: determining whether the at least one selected object is a moving object or a stationary object; in case the at least one selected object is a moving object, obtaining from the received command an object tag corresponding to the at least one selected object, and identifying the at least one selected object in the latest available captured image; in case the at least one selected object is a stationary object, obtaining from the received command an image or piece thereof comprising the at least one selected object and identifying the at least one selected object in the latest available captured image.

The system and method disclosed herein can further include one or more of the following features:

a) wherein the object-tag is associated with a respective moving object to yield the respective tagged object, based on information indicative of a location of the moving object in the succession of images; the method and system further enable: tracing the tagged object, from an earlier image in the succession of images to a later image in the succession of images, thereby maintaining a given object-tag associated with a respective moving object along the succession of images.

b) The method and system further enable: continuously sending a flow of images from the succession of images to the control unit.

c) The method and system further enable: in case the at least one selected object is a stationary object, matching the image or piece thereof to the latest available captured image; identifying the at least one selected object in the image or piece thereof, in order to identifying the at least one selected object in the latest available captured image.

d) The method and system s a real-time location of the selected object; and generating direction commands to the image sensor, such that the selected object is located in a real-time image of the scene generated by the image sensor.

e) The method and system further enable: storing information with respect to the one or more objects and respective object tags in a data-repository associated with the sensing unit.

f) The method and system further enable: in the control unit:

receiving a captured image from the sensing unit;

displaying the image on a display operatively connected to the control unit;

responsive to selection of an object in the image, determining whether the selected object is a moving object or stationary object;

in case the selected object is a moving object, identifying an object-tag assigned to the selected object and generating a command comprising the object-tag;

in case the selected object is a stationary object, generating a command comprising the image or part thereof; and sending the command to the sensing unit.

g) The method and system further enable: executing the command with respect to the selected object notwithstanding a time-delay between a time when the sensing unit acquires the image with the selected object, to a time when a corresponding command is received at the sensing unit with respect to the selected object.

According to another aspect of the presently disclosed subject matter there is provided a non-transitory computer storage device readable by machine, tangibly embodying a program of instructions executable by the machine to perform the method of tracking objects as disclosed above in the previous aspect.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIGS. 6a-6c are schematic illustrations exemplifying the tracking method of a stationary object, in accordance with the presently disclosed subject matter.

DETAILED DESCRIPTION

Figure 1:
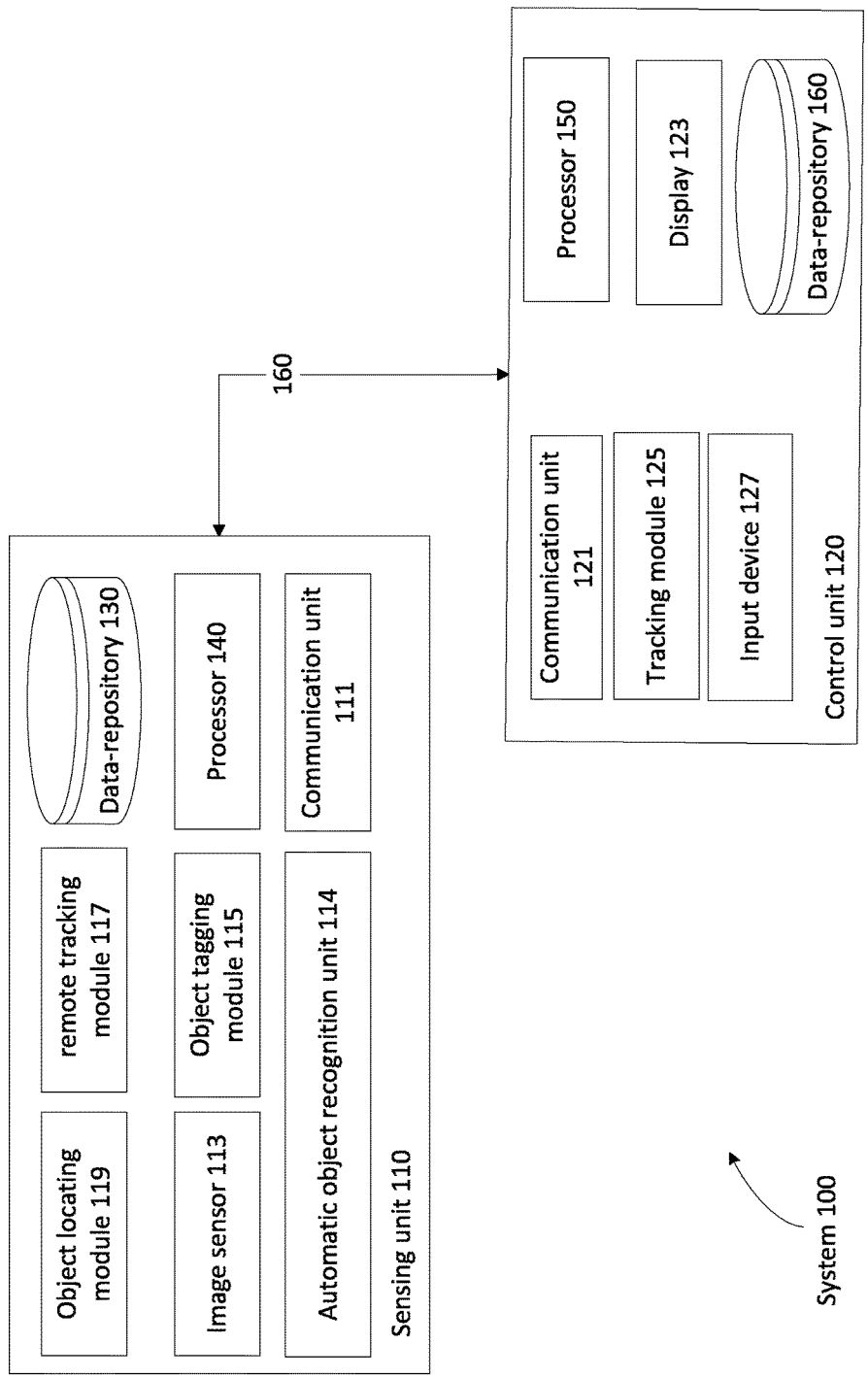
FIG. 1 is a functional block diagram schematically illustrating a tracking system, in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "identifying", "obtaining", "assigning", "determining" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof. As explained below the system described herein with reference to FIG. 1 comprises a computer (e.g. processors 150 and 140).

The operations in accordance with the teachings herein may be performed by a computer specially constructed for the desired purposes or by a general purpose computer specially configured for the desired purpose by a computer program stored in a computer readable storage medium.

As used herein, the phrase "for example," such as", for instance" and variants thereof describe non-limiting embodiments of the presently disclosed subject matter. Reference in the specification to one case", some cases", "other cases" or variants thereof means that a particular feature, structure or characteristic described in connection with the embodiment(s) is included in at least one embodiment of the presently disclosed subject matter. Thus the appearance of the phrase one case", some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
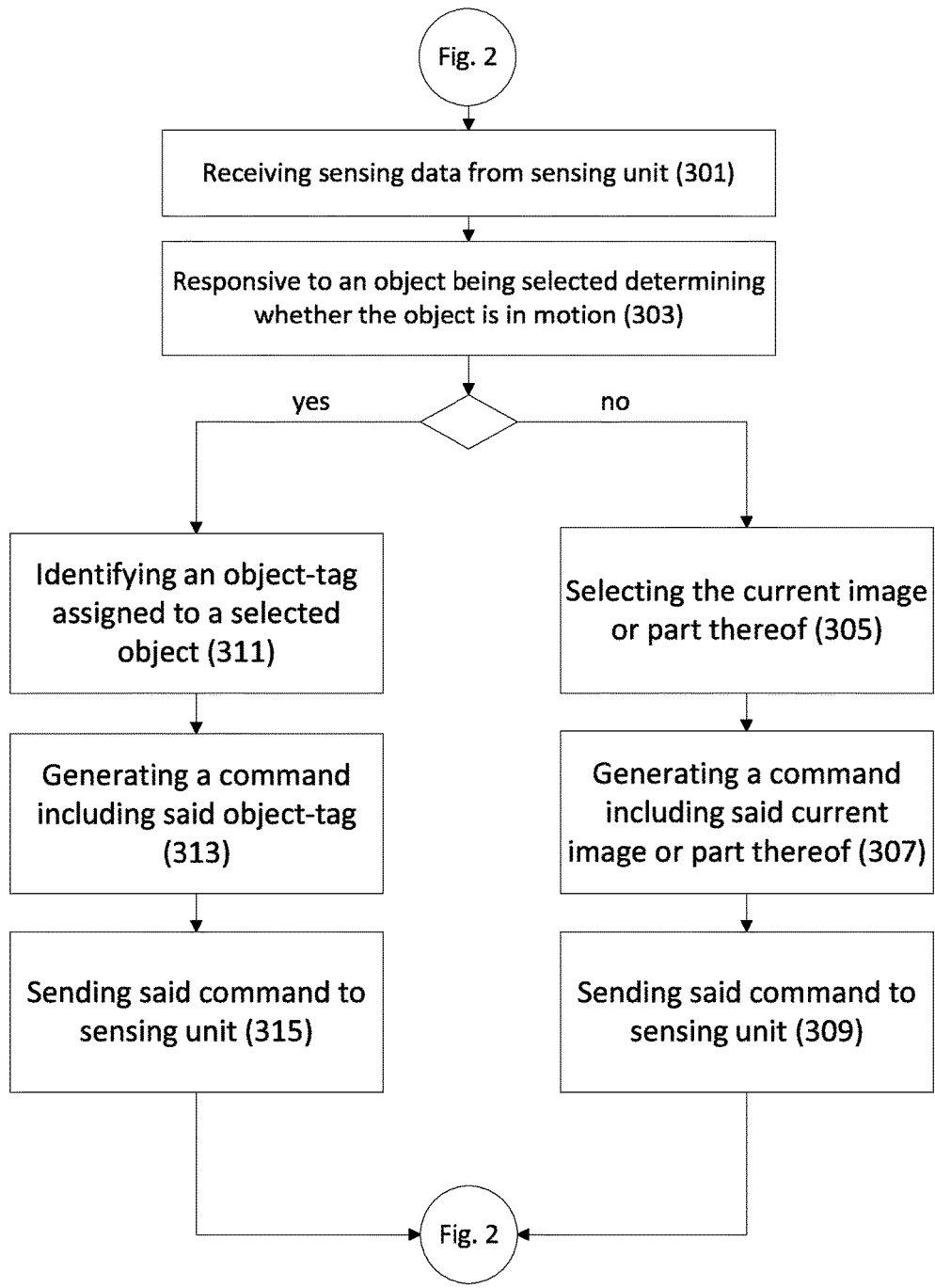
FIG. 3 is a flowchart illustrating operations performed by a control unit, in accordance with the presently disclosed subject matter.
Figure 4:
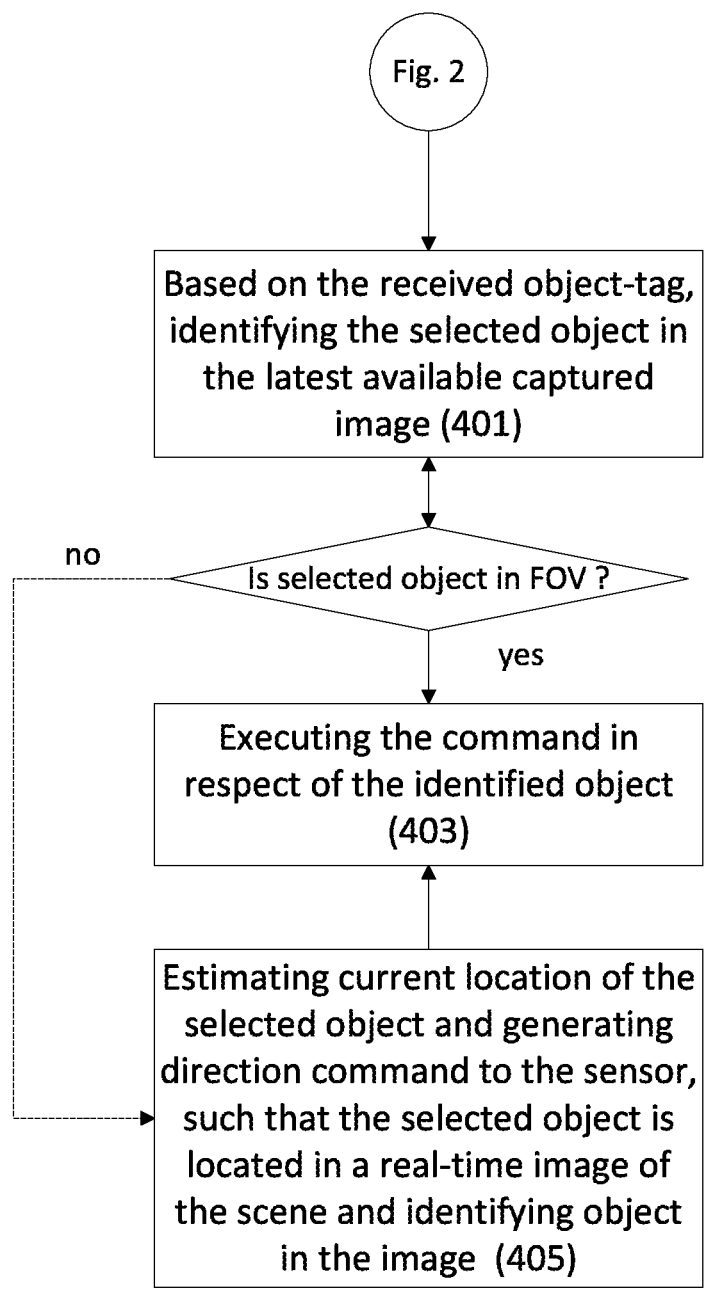
FIG. 4 is a flowchart illustrating operations performed by a sensing unit, in accordance with the presently disclosed subject matter.
Figure 5:
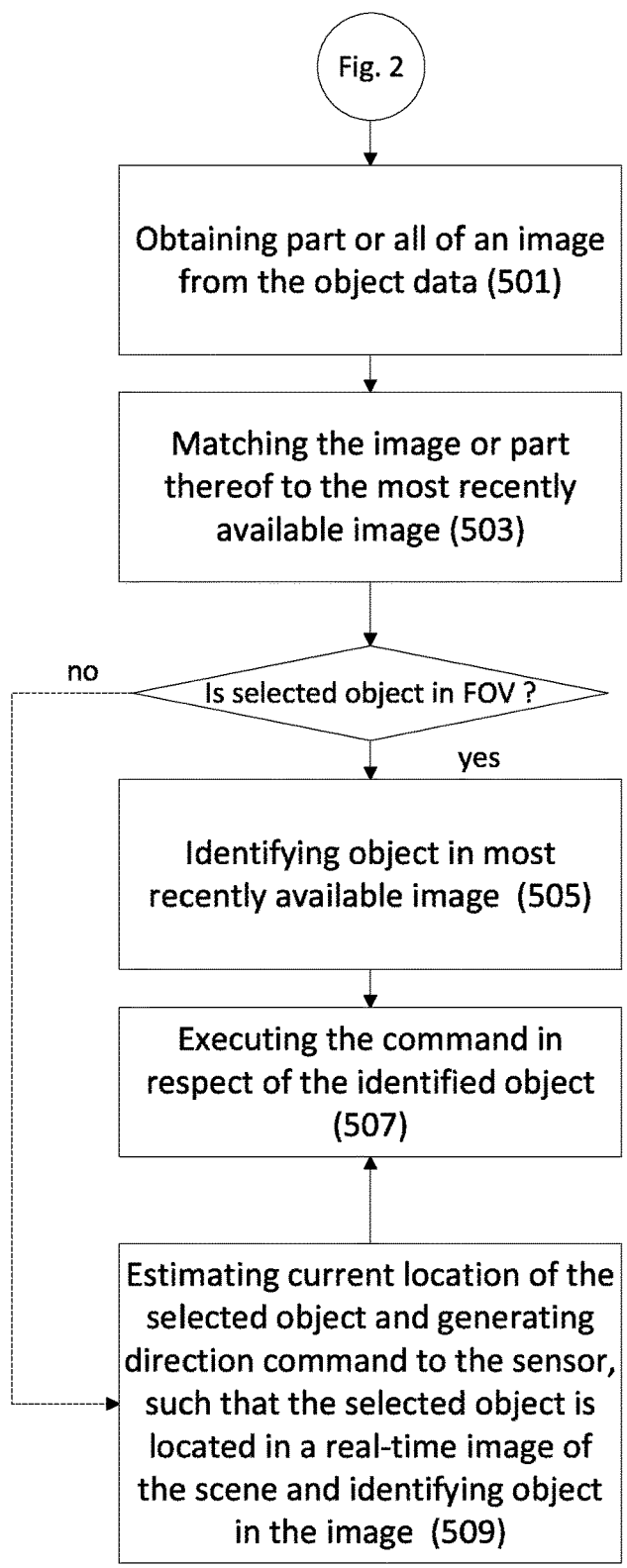
FIG. 5 is a flowchart illustrating operations performed by a sensing unit, in accordance with the presently disclosed subject matter.

In embodiments of the presently disclosed subject matter, fewer, more and/or different stages than those shown in FIGS. 3 to 5 may be executed. In embodiments of the presently disclosed subject matter one or more stages illustrated in FIGS. 3 to 5 may be executed in a different order and/or one or more groups of stages may be executed simultaneously. FIG. 1 illustrates a general schematic of the system architecture in accordance with an embodiment of the presently disclosed subject matter. Functional elements (e.g. modules) in FIG. 1 can be made up of a combination of software and hardware and/or firmware that performs the functions as defined and explained herein. The Functional elements in FIG. 1 may be centralized in one location or dispersed over more than one location. In other embodiments of the presently disclosed subject matter, the system may comprise fewer, more, and/or different Functional elements than those shown in FIG. 1. The functional elements (e.g. modules) in FIG. 1 can comprise at least one respective computer processor and/or computer memory or can be a part of a computer processor or of a computer memory, the computer processor and the memory being configured for executing instruction for performing the respective functions.

It should be noted that the term "criterion" as used herein should be expansively construed to include any compound criterion, including, for example, several criteria and/or their logical combinations.

Bearing the above in mind, attention is now drawn to FIG. 1 showing a functional block diagram schematically illustrating a tracking system, in accordance with the presently disclosed subject matter. FIG. 1 shows tracking system 100 comprising sensing unit 110 and control unit 120 communicating over a communication link 160. Sensing unit 110 and control unit 120 can be located remotely from each other. For example, control unit 120 can be located on the ground while sensing unit 110 is located onboard an Unmanned Aerial Vehicle, an Unmanned Ground Vehicle, an unmanned Vessel, in a missile, in a satellite, etc. Communication between sensing unit 110 and control unit 120 can be facilitated for example, with the help of communication module 111, located in sensing unit 110 and communication module 121 located at the control unit 120.

According to the teaching disclosed herein, sensing unit 110 further comprises an image sensor 113, an object-tagging module 115, and data-repository 130 (non-transitory computer memory of some sort). Image sensor 113 can be any device configured for acquiring information with respect to a scene and generate a succession of images. Image sensor 113 includes for example an image sensing device such as a camera, radar (e.g. Synthetic Aperture Radar), sonar, laser, etc.

Image sensor 113 is configured to capture images of the surveyed scene. A succession of images of the scene is generated, in sensing unit 110, and transmitted to object-tagging module 115. Object-tagging module 115 is configured in turn to identify moving objects appearing within a captured image and assign to each one of part or all of the identified objects a tag (herein "object-tag") which uniquely identifies the moving object. Methods of identifying moving images in a succession of images in a stream of images are well known in the art. For example moving objects can be identified with the help of a Video Motion Detection (VMD) algorithm. To this end, object-tagging module 115 can comprise or be otherwise associated with a VMD module configured for implementing a VMD algorithm on the succession of images and identifying moving objects therein.

It is noted that the term "object" as used herein should be broadly interpreted to include any type of identifiable object in an image of a scene or part thereof, including a specific type of object in an image of a scene (e.g. car, building, person, aircraft etc.) as well as a discernible group of one or more pixels (e.g. a group of moving pixels or a group of pixels characterized by a discernible temperature or color with respect to the surrounding scene) or an area selected in an image of the surveyed scene. An object-tag can be any number, name, character, insignia, icon etc. which can be assigned to an object and used for identifying the object.

In the following discussion an object assigned with a tag is referred to as a "tagged object". The image, the object-tags of the tagged objects, and possibly additional object-data can be stored in data-repository 130. The term "object-data" includes one or more characteristics of objects, such as coordinates with respect to the acquired image and/or coordinates with respect to global position of the object, object's velocity, object's size, object's temperature, object's color, object's shape, correlation data and any information which may help in the identification of an object within a given image.

Optionally, not all moving objects in a scene are tagged by tagging module 115. Rather, specific objects can be selected based on different parameters. For example, specific objects can be selected with the help of a dedicated processing unit configured to select objects in a scene which match some criterion. To this end, sensing unit 110 can be equipped with an automatic object recognition unit (AOR) 114.

AOR unit 114 is configured to select objects in a scene, to be tagged with respective object-tags, based on the characteristics of the objects. The AOR unit 114 can be preprogrammed with predefined characteristics of sought after objects. Such characteristics can include for example, size of a moving object, velocity of a moving object, temperature emanating from a moving object, etc. AOR unit 114 can be configured to obtain information indicative of moving objects in the succession of captured images (e.g. from VMD module), analyze the received information and determine the characteristics of moving objects in the images. AOR unit 114 can then determine whether these characteristics meet some type of predefined criterion and generate an indication accordingly. AOR unit 114 can be configured to transmit to object-tagging module 115 information indicating which of the moving objects comply with the predefined characteristics of the sought after objects. In turn, object-tagging module 115 can be configured to tag the moving object (or objects) indicated by AOR unit 114.

Object-tagging module 115 is further configured to receive the images captured by image sensor 113 and trace the tagged objects from an earlier image to a later image along the succession of captured images, thereby maintaining each object-tag associated with its respective tagged-object along the succession of images and enabling to track tagged objects from one image to the next along the succession of images. If the position of a tagged object is changed, the respective stored location of the tagged object (e.g. in data-repository 130) is updated accordingly. During the operation of image sensor 113 new moving objects, which enter the FOV of image sensor 113, are detected and assigned with respective object-tags.

Methods for tracing objects from an earlier image to a later image along a succession of images are well known in the art and include for example the VMD algorithm which enables tracing moving objects as they are detected from one image to a sequential image. Other methods are based on center of gravity identification, edge detection, correlation etc. Note that as used herein the term "later" includes an image which is captured at a later time than an image captured at an earlier time (i.e. an earlier image). The term "later image" includes, but is not limited to, a consecutive image.

Once one or more moving objects (and in some cases all moving objects) in the captured images are identified and tagged, sensing-data is transmitted via communication module 111 to control unit 120. Sensing data includes the captured succession of images, one or more object-tags assigned to moving objects identified in the captured images, and possibly also additional object-data with respect to the tagged objects. The object-data can include for example, correlation data which enables to associate an object-tag with a respective object in an image in the succession of images (e.g. their respective coordinates in the image). Object-tags can be transmitted to control unit 120 for example as an overlay of the respective image (i.e. as part of the image data) or as additional information to the image.

Sensing-data is received by communication module 121 in control unit 120 and can be displayed on display 123 (e.g. LCD or LED screen). Sensing-data can also be stored in data-repository 160.

One or more objects can be selected (hereinafter "selected object") in an image displayed at control unit 120 and a command can be generated with respect to the one or more objects. For example, an operator can generate a lock command which instructs sensing unit 110 to lock and track a selected object. An object can be selected by any way known in the art for example, by pointing or otherwise marking an object of interest with the help of an input device 127 associated with control unit 120. The input device can be for example, a joystick, a mouse, a touch pad, or any other device or method enabling interaction with the display.

Once an object is selected, tracking module 125 is configured to determine whether the selected object is a moving object or a stationary object. Methods for distinguishing between moving objects and stationary objects are described below with reference to block 403 in FIG. 4.

Once it is determined whether the selected object is moving or stationary, a different approach is adopted for handling each type of object. In case the selected object is in motion, tracking module 125 is configured to identify the object-tag which has been assigned to the selected object and incorporate the object-tag in the generated command. The command (i.e. control data), which is transmitted back to sensing unit 110, includes at least the object-tag of the selected object and possibly also the command type.

In case the selected object is a stationary object, tracking module 125 is configured to incorporate in the control-data of the command the entire image in which the object was selected. Alternatively, in order to reduce the size of the control data in the command, rather than using the entire image, tracking module 125 can be configured to copy a piece of the image surrounding the selected object and incorporate the piece of the image in the command. The control data includes, in addition to the copied piece of image or entire image, data indicative of the location (e.g. in x, y coordinates) of the selected object in the image. In case a piece of the image is used, the coordinates indicate the location of the selected object with respect to boundaries of the copied piece of the image.

The command is transmitted back to sensing unit 110. Different types of commands can be generated with respect to an object (e.g. at control unit 120) including for example, command to track a selected object, command to zoom in on a selected object, command to mark a selected object, command to obtain data with respect to a certain parameter (e.g. velocity) of a selected object, etc.

The command is received by sensing unit 110 and transmitted to remote tracking module 117. Remote tracking module 117 can be configured to process the command and determine, based on the received control-data in the command, whether the command was generated with respect to a moving object or a stationary object. A command generated with respect to a moving selected object comprises control-data which includes a respective object-tag and a command generated with respect to a stationary selected object includes an image or a piece thereof. Alternatively or additionally, each type of command can also include specific data indicating whether the command was generated with respect to a moving object or a stationary object.

In case it is determined that the command was generated with respect to a moving object, tracking module 117 can be configured to extract from the control-data, the object-tag (or object-tags) assigned to the selected object or objects. Remote tracking module 117 can be further configured to obtain (e.g. from object-tagging module 115) the latest available captured image (i.e. most recently captured image which is available for processing) along with information with respect to the object-tags assigned to objects in the image. With the help of the object-tag received in the command, tracking module 117 can locate the selected object within the latest available captured image. Once the object is located in the current image, the issued command can be executed. For example, in case of a command to lock on and track an object, sensor 113 can be provided with appropriate instructions for locking and tracking the selected object. Remote tracking module 117 can continue and track the object along a succession of later images as they are being captured by the image sensor 113 and transmitted to remote tracking module 117.

In case it is determined that the command was generated with respect to a stationary object, tracking module 117 can be configured to extract from the control-data, the image or piece thereof along with the coordinates indicating the location of the selected object in the image or piece thereof. Tracking module 117 can then match between the received image or piece thereof and the latest available captured image. The received image or piece thereof can be positioned on the latest available captured image such that the matching parts in the two images overlap. The information indicating the location of the selected object is used for locating the selected object in the latest available captured image.

Thus, the tracking system and method disclosed herein enables to lock and track an object selected in an image displayed at the control unit, notwithstanding a time-delay between the time the sensing unit acquired the image to a time when the lock command is received from the control unit, at the sensing unit, with respect to the selected object. Note, that according to the presently disclosed subject matter a it is sufficient to search for selected object in the latest available captured images and not in previously captured images.

A more detailed description of the operations executed by sensing unit 110 and control unit 120 is disclosed below with reference to FIGS. 3 to 5.

Figure 2:
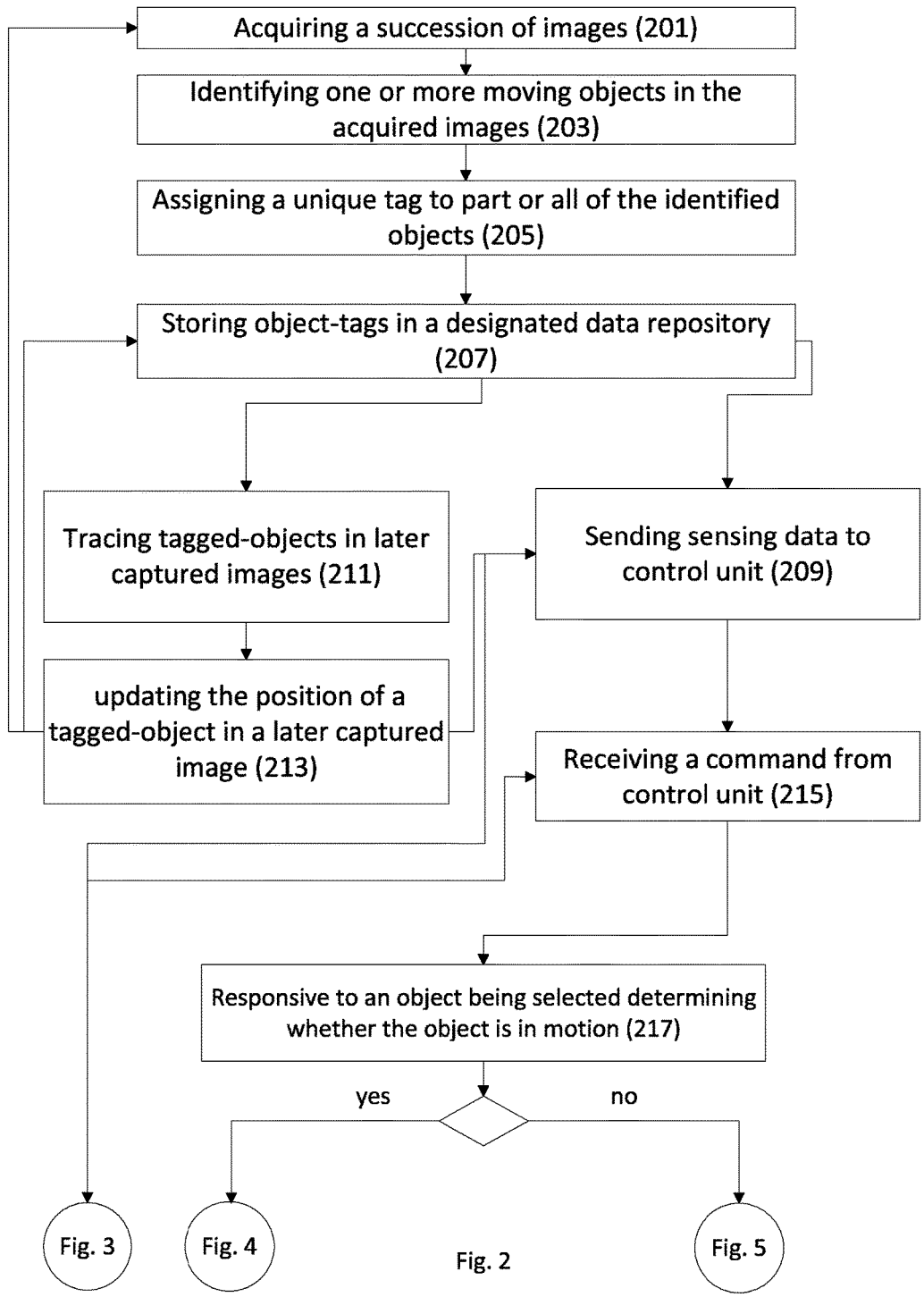
FIG. 2 is a flowchart illustrating operations performed by a sensing unit, in accordance with the presently disclosed subject matter.

FIG. 2 is a flowchart illustrating operations performed by sensing unit, in accordance with the presently disclosed subject matter. Operations described with reference to FIG. 2 can be executed, for example, with the help of tracking system described above with reference to FIG. 1.

An image sensor acquires images of a surveyed scene and a succession of images of the scene is generated (block 201). The succession of images is processed at the sensing unit and one or more moving objects appearing in the images are identified (block 203).

Methods for identifying moving objects in a succession of captured images (e.g. video stream) are well known in the art and therefore shall not be discussed here in detail. It is noted however that, as mentioned above, moving objects can be identified for example, with the help of a VMD module implementing a VMD algorithm.

Once the moving objects within the acquired image are identified, these objects are assigned with respective object-tags which uniquely identify each moving object (block 205). This task can be accomplished for example with the help of object-tagging module 115 in sensing unit 110.

In some cases, every moving object which is identified in the acquired images is tagged with a respective tag. In other cases only part of the moving objects identified in the acquired images are tagged. As explained above, optionally objects in the acquired images can be screened based on a predefined criterion, where only those objects which meet the criterion are tagged by sensing unit 110. For example, objects can be screened based on size (e.g. tagging an object only if its size is greater than a predefined value), based on shape (e.g. tagging an object only if its shape matches a predefined shape), based on temperature (e.g. tagging an object only if it emits a temperature which is greater than a predefined temperature value), based on velocity (e.g. tagging an object only if it travels at a velocity greater than a predefined velocity). Objects can also be screened based on their dispersion across the image, for example, only a single object is tagged from among a plurality of identified objects within an acquired image in case the objects are gathered together such that distance between different objects is less than a predefined distance.

The object-tags assigned to the moving objects in the acquired image and optionally also object-data, can be stored in a designated data repository (block 207). For example, the data can be stored in a data structure (e.g. hash table) which associates x, y coordinates indicating the position of a moving object within an acquired image i and an object-tag assigned to that object. Optionally, the acquired image can be stored as well, however this is not necessary and in some cases previously captured images are discarded once a newer image is captured.

Sensing data including at least one acquired image and the tags for moving objects assigned to moving objects in the acquired image are transmitted to the control unit (block 209). Sensing-data can also include object-data with respect to the tagged objects, including for example coordinates indicating the location of each tagged object within the acquired image, and possibly other characteristics of the tagged objects (e.g. shape, size, temperature, color etc).

Images of the surveyed scene are continued to be captured by the image sensor (113) and tagged moving objects identified in an earlier acquired image are traced (e.g. with the help of object-tagging module 115) to later captured images (block 211).

The position of a moving object in an earlier image is likely to change in later images due to movement of the object. Accordingly, the sensing unit is configured to trace each tagged-object from an earlier image to a later image in the succession of images captured by image sensor, and determine the position (e.g. x and y coordinates) of the moving object in the later image (block 211).

At block 213 it is determined whether the position of a tagged-object in the later image is different than the position of the object in the earlier image, and in case it is, the information indicating the position of the object is updated. The updated position of the object is associated with the respective object-tag (e.g. in data repository 130). This enables the sensing unit to maintain each object-tag associated with its respective tagged-object along the succession of images and locate a tagged object in the latest available captured image based on its assigned object-tag although its position changes from one image to another.

Sensing-data including later images and updated object-data (including for example updated location of tagged objects) is continued to be sent to control unit (e.g. according to the order they are captured) (block 209).

In order to reduce the occupied computer memory space in the sensing unit, tagged-objects which cease to move, and thus become stationary, are no longer tracked by remote tracking module 117 and are treated as stationary objects. The information stored with respect to such tagged-objects can be discarded from the data repository.

The description now turns to FIG. 3, which is a flowchart illustrating operations performed at control unit 120, in accordance with the presently disclosed subject matter.

Sensing-data generated at sensing unit 110 is continued to be received at the control unit (block 301). The sensing data includes the images which are acquired at the sensing unit. If one or moving objects were identified and tagged, the sensing data also includes information indicative of the respective object-tags assigned to the identified moving objects. The objects-tags can be associated with the respective objects in the succession of images based on the location of the objects in a respective image. Thus, sensing-data can include for each captured image in a succession of images, a captured image, an object-tag of a moving object in the image and data indicative of the location of the tagged object in the image.

Responsive to an object (or objects) being selected in the control unit, it is determined whether the selected object is a moving object or a stationary object (block 303). According to one example this can be accomplished based on whether the selected object is assigned with a respective object-tag or not. If it is, it is identified as a moving object and if it isn't, it is identified as a stationary object. Optionally, the sensing unit can be configured to assign a universal tag, indicating that a given object is in motion, to all identified moving objects. In such cases, tracking module 125 can determine whether a selected object is moving or stationary based on this universal tag. Alternatively or additionally, control unit 120 can comprise a VMD module for identifying moving objects.

In case it is determined that the selected object is a stationary object, part of the current image (the image in which the object was selected) displaying the selected object is copied (or cut) from the entire image (block 305). An appropriate command is generated, including the copied piece of the current image (block 307). For example, in case an operator selects an object and initiates a lock and track command instructing to lock on and track the selected object, an appropriate command is generated in the control unit. The control-data in the generated command includes the piece of image extracted from the current image and information indicative of the location of the selected object in the copied piece of image. In some cases, instead of copying a part of the current image the entire image can be selected and incorporated in the generated command. The generated command is sent to sensing unit 110 (block 309).

FIG. 6a and FIG. 6c are schematic illustrations exemplifying the tracking method of a stationary object, in accordance with the presently disclosed subject matter. FIG. 6a shows a scene being monitored by a sensing unit (e.g. 110). The scene includes 3 buildings and a car. Sensing unit captures images of the scene and sends the images (in a succession of images) to a control unit (e.g. 120). FIG. 6b shows image I which is an example of an image (captured by the sensing unit) covering a portion of the scene which is being displayed at the control unit. Assuming an operator of the control unit wishes to track window 601, the operator selects window 601 in image I. In response to the operator's action, control unit 120 determines that the selected object is stationary and then cuts a piece of image I (603) which includes the selected window. A tracking command is then generated comprising image piece 603 along with information indicating the location of window 601 (e.g. x, y coordinates) within the image or within image-piece 603. The coordinates of the window within the copied piece 603 can be calculated by subtracting the offset (OS) of the boundaries of image-piece 603 from the coordinates of the window with respect to image I.

Reverting to block 303 in FIG. 3, in case it is determined that the selected object is a moving object the object-tag which was assigned by the sensing unit to the selected object is identified (block 311). For example the sensing-data can include an image, one or more object-tags and the updated location of each of the respective tagged objects within the image. This enables the control unit to associate between a selected object and its corresponding object-tag based on the location of the object within the image. In another example, object-tags can be incorporated as an overlay of the image such that object tags can be associated to their respective objects within the image.

A command is generated, including the object-tag of the selected object (block 313). For example, in case an operator selects an object and initiates a command instructing to track the selected object, a tracking command including the object-tag of the selected object is generated in control unit 120 (e.g. with the help of tracking module 125). The generated command is sent to the sensing unit (block 315), which is configured to process the command and execute its respective instructions as described below.

As mentioned above, if a tagged-object previously identified as a moving object ceases to move it is no longer tracked by the sensing unit and is treated as a stationary object and its respective information is discarded from the data-repository. Due to a communication time-delay between a time when the sensing unit acquires an image of an object, to when the image is displayed on the display located at the control unit and further to the time the corresponding instructions are received at the sensing unit, an object which is considered as a stationary object at the sensing unit may still be considered a moving object at the control unit.

This may cause a problem if such an object is selected at the control unit immediately after it has stopped moving and turned from a moving object to a stationary object at the sensing unit. In such case, the sensing data received at the control unit would identify the object as a moving object and therefore, once selected, it will be treated as such by the control unit. Accordingly, responsive to the selection of the object, the control unit would generate a command fitted for moving objects. However, as the object is now considered as stationary at the sensing unit and as the respective information with respect to the object (including the object tag) has been discarded from the data-repository the sensing unit will not be able to execute the command using the received control data.

Thus, according to the presently disclosed subject matter in order to avoid a possible discrepancy between the sensing unit and the control unit, if a given tagged object, which has been identified as a moving object ceases to move, the sensing unit (e.g. with the help of tracking module 117) does not immediately discard the information stored in the data repository with respect to the given object. The information is maintained in the data repository for a time period which is equal to (or possibly somewhat greater than) the communication time-delay mentioned above.

During this time period the given object is treated as stationary object at the sensing unit and accordingly the sensing data, which is sent to the control unit, together with images of the scene does not include the object-tag of the given object. If however, the given object is selected at the control unit during this time period, while it is still considered at the control unit as a moving object, a respective moving object command is generated and sent to the sensing unit. The sensing unit is able to execute the command based on the information which is maintained in the data-repository. Once the time period lapses the information stored in the data repository with respect to the given object is discarded.

Reverting to FIG. 2 a command generated at control unit 120 is received in sensing unit 110 (block 215). In response to the command, it is determined whether the incoming command is generated with respect to a moving object or a stationary object (block 217). A command includes either an object-tag (in case the command was generated with respect to a moving object) or a part of an image (in case the command was generated with respect to a stationary object). Determining whether the selected object in a received command is a moving command or a stationary command can be based on the content of the command. For example, the command can include data indicating whether the respective selected object is stationary or in motion. Alternatively, sensing unit 110 can be configured to determine whether the respective selected object is stationary or in motion based on whether the command includes an object-tag or a part of an image.

FIG. 4 is a flowchart illustrating the operations which are performed in case it is determined that a received command was made with respect to a moving object and FIG. 5 is a flowchart illustrating the operations which are performed in case it is determined that a received command was made with respect to a stationary object.

In FIG. 4, in response to a command generated with respect to a moving object, sensing unit 110 is configured to locate the object, which is identified by the respective object-tag incorporated in the command, in the latest available captured image (block 401). According to one example, in order to identify the selected object in the latest available captured image, sensing unit (e.g. with the help of remote tracking module 117) can be configured, to use the received object-tag, search data repository 130 for the object-tag, find the updated position of the respective tagged object and use its most updated position in order to locate the tagged object in the latest available captured image.

Once the object is identified in the latest available captured image, sensing unit 110 executes the command with respect to the identified object (block 403). For example, in case of a command instructing to lock and track on an object, sensing unit (e.g. with the help of remote tracking module 117) can generate instructions for image sensor 113 to lock on and track the object identified by the object-tag specified in the command.

In some operational scenarios, objects which are identified and tagged by object-tagging module 115 in an earlier acquired image, may drift out of the field of view (FOV) of the image sensor and consequently only partially appear, or even completely disappear from later images. Thus, due to the time-delay mentioned above, it may occur that by the time a command, associated with a certain object-tag is received at sensing unit 110, the respective tagged object may not appear in the latest available captured image.

Thus, according to the presently disclosed subject matter sensing unit 110 can optionally comprise an object locating module 119 which is configured to estimate the current location of a selected object which is not located in the latest captured image (by the time the command reaches sensing unit 110), and generate direction commands to the image sensor for locating the object and generating a real-time image that includes the object.

Different methods for estimating the current location of the sought-after object can be employed by object locating module 119. One such method is disclosed in US Patent Publication No. 2008267451 which is incorporated herein by reference. According to this method the current location of the object is estimated, e.g. by calculating the trajectory that the object has traveled so far. According to one example, the trajectory of an object can be determined based on the trajectory of the object in a succession of previous images, and, based on the so determined trajectory, estimating the current location of the object, using known per se trajectory estimation techniques. As mentioned above, the trajectory and velocity of tagged objects can be calculated and stored (e.g. in data repository 130), and utilized by object locating module 119 to estimate real-time location of an object.

Having determined the estimated location of the object, appropriate commands can be generated (e.g. by object locating module 119) for directing the FOV of image sensor 113 towards the estimated location of the object. For example, providing appropriate direction commands to a gimbal mechanism to which image sensor 113 is attached, allows the sensor to acquire real-time image that includes the selected object. Note that commands generated for repositioning a gimbal mechanism should also take into consideration a time interval of the duration it takes for directing the image sensor to the desired new location for acquiring a real-time image which includes the object (including for example, time required for mechanically/electronically redirecting the image sensor).

It should be noted that the presently disclosed subject matter is not bound by any specific object trajectory determination and/or estimation techniques. It should be further noted that the trajectory determination disclosed herein does not necessarily require utilizing succession of images comprising a certain number of images. Any two or more images can be utilized to this end and the so utilized images are not necessarily consecutive.

Reverting to block 401 in FIG. 4, in case the selected object cannot be located in the latest available captured image, the estimated real-time location of the object is estimated and direction commands are generated for image sensor 113, such that the object is located in a real-time image of the scene generated by image sensor (block 405). As before, once the object is identified in the latest available captured image, sensing unit 110 executes the command with respect to the identified object (block 403). Estimation of real-time location of an object can be accomplished for example, with the help of object location module 119.

In FIG. 5, in response to a command generated with respect to a stationary object, sensing unit 110 is configured to locate a selected stationary object, in the latest available captured image. The image-piece is extracted from the control-data of the received command (block 501). As explained above, the command can include an entire image or part thereof along with data indicating the location of the selected object in the image or the part thereof (e.g. coordinates of the object in the image or part thereof).

The image-piece (or in some cases the entire image) is matched to the most recently available captured image (block 503). The most recently available image is matched to the image or part thereof so that identical regions in the two images are overlapped and thus identified. This can be accomplished for example with the help of image registration techniques which are well known in the art.

After the image-piece and the most recently available image are matched, the selected object can then be located in the most recently available image at the point which overlaps with the location of the selected object indicated in the piece of copied image (block 505). Once the object is identified in the most recently available image, the command with respect to the object is executed (block 507).

Reverting to the example in FIG. 6a, responsive to a command received at sensing unit 110, and assuming that the selected object was identified as a stationary object, sensing unit 110 locates image-piece 603 in the latest available captured image (image II in FIG. 6c). Note, that the image II is different than image I as it covers a different region of the scene however Image-piece 603 still overlaps image II. Once image-piece 603 is located in image II, the location of window 601 can be found within image II based on its location within image part 603. It is noted that in some cases the piece of image (or entire image) received from with the command only partially overlaps the latest available captured image.

As explained above, in case the selected object cannot be located in the latest available captured image, the estimated real-time location of the object is estimated and direction commands are generated for image sensor 113, such that the object is located in a real-time image of the scene generated by image sensor 113. As before, once the object is identified in the latest available captured image, sensing unit 110 executes the command with respect to the identified object (block 509).

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A tracking system comprising:
   a sensing unit comprising an image sensor, and a control unit;
   wherein the sensing unit is configured to:
   communicate over a communication link with the control unit;
   capture, with the help of the image sensor, two or more images of a scene;
   generate a succession of images;
   identify one or more moving objects in said succession of images;
   assign an object-tag to at least one of said moving objects to yield a respective tagged object;
   send, to the control unit, data including at least:
   an image of the succession of images; and
   the tagged object;

trace the tagged object, from an earlier image in said succession of images to a later image in said succession of images, thereby maintaining a given object-tag continuously associated with a respective moving object along said succession of images;
wherein the control unit is configured to:
receive input indicative of a selection of at least one object in an image received from the sensing unit; and
responsive to the selection of the object in said image, determine whether the at least one selected object is a moving object or a stationary object;
in the case the at least one selected object is a moving object:
identify an object-tag assigned to the at least one selected object; and
generate a first type of command comprising said object-tag;
in the case the at least one selected object is a stationary object:
generate a second type of command comprising data about said image or part thereof that comprises the at least one selected object; and
send said command to the sensing unit, wherein said command further comprises an indication whether the at least one selected object is a moving object or a stationary object;
wherein the sensing unit is further configured to:
responsive to said command received from said control unit indicative of at least one selected object, identify a location of the at least one selected object in a latest available captured image, the identification comprising:
determining whether the at least one selected object is a moving object or a stationary object based on said indication of said received command;
in the case the at least one selected object is a moving object:
using the object-tag, obtained from the received first type of command, corresponding to the at least one selected object, for identifying the at least one selected object in the latest available captured image without first identifying the selected object in another previously captured image responsive to the command; and
in the case the at least one selected object is a stationary object:
using the image or piece thereof, obtained from the received second type of command, comprising the at least one selected object, for identifying the at least one selected object in the latest available captured image.

2. The tracking system according to claim 1, wherein said object-tag is associated with a respective moving object to yield said respective tagged object based on information indicative of a location of said moving object in said succession of images.

3. The tracking system according to claim 1, wherein said sensing unit is configured to continuously send a flow of images from said succession of images to said control unit.

4. The tracking system according to claim 1, wherein said sensing unit is further configured to:
in the case the at least one selected object is a stationary object, match said image or piece thereof to said latest available captured image; and
identify the at least one selected object in said image or piece thereof.

5. The tracking system according to claim 1, wherein said sensing unit is configured to identify said one or more moving objects with the help of a Video Motion Detection algorithm.

6. The tracking system according to claim 1, further comprising an object locating module configured to:
in case said selected object is not located in a field of view of said image sensor, estimate a real-time location of the selected object; and
generate direction commands to said image sensor, such that said selected object is located in a real-time image of the scene generated by the image sensor.

7. The tracking system according to claim 1, wherein said command is a tracking command for instructing said sensing unit to track the selected object.

8. The tracking system according to claim 1, wherein said control unit is further configured to:
receive a captured image from said sensing unit; and
display said image on a display operatively connected to the control unit; and
wherein said selection is made by an operator interacting with the control unit.

9. The tracking system according to claim 1, further configured to execute said command with respect to the selected object notwithstanding a time-delay between a time when the sensing unit captures the image with the selected object, to a time when a corresponding command is received at the sensing unit with respect to the selected object.

10. The tracking system according to claim 1, being further configured to:
store information with respect to said one or more objects and respective object-tags in a data-repository associated with the sensing unit;
determine that a given tagged object is no longer moving;
maintain in the data repository information with respect to the given tagged object and a respective object-tag for a time period which is equal or greater than a communication time-delay between the sensing unit and the control unit; and
discard the information once the time period lapses.

11. A method of tracking objects, the method comprising:
in a sensing unit comprising an image sensor, perform at least the following with the help of at least one computer processor:
capturing two or more images of a scene;
generating a succession of images;
identifying one or more moving objects in said succession of images;
assigning an object-tag to at least one of said moving objects to yield a respective tagged object;
sending, to a control unit communicating with said sensing unit, data including at least:
an image of the succession of images; and
the tagged object;
tracing the tagged object, from an earlier image in said succession of images to a later image in said succession of images, thereby maintaining a given object-tag continuously associated with a respective moving object along said succession of images;
in the control unit:
receiving input indicative of a selection of at least one in an image received from the sensing unit;
responsive to the selection of the object in said image, determining whether the at least one selected object is a moving object or a stationary object;
in the case the at least one selected object is a moving object:

identifying an object-tag assigned to the at least one selected object; and generating a first type of command comprising said object-tag;

in the case the at least one selected object is a stationary object:

generating a second type of command comprising data about said image or part thereof that comprises the at least one selected object; and sending said command to the sensing unit, wherein said command further comprises an indication whether the at least one selected object is a moving object or a stationary object;

in the sensing unit:

identifying, responsive to said command received from said control unit indicative of at least one selected object, a location of the at least one selected object in a latest available captured image, the identification comprising:

determining whether the at least one selected object is a moving object or a stationary object based on said indication of said received command;

in the case the at least one selected object is a moving object, using the object-tag, obtained from the received first type of command, corresponding to the at least one selected object, for identifying the at least one selected object in the latest available captured image without first identifying the selected object in another previously captured image responsive to the command; and in the case the at least one selected object is a stationary object, using the image or piece thereof, obtained from the received second type of command, comprising the at least one selected object, for identifying the at least one selected object in the latest available captured image.

12. The method according to claim 11, wherein said object-tag is associated with a respective moving object to yield said respective tagged object, based on information indicative of a location of said moving object in said succession of images.

13. The method according to claim 11, further comprising continuously sending a flow of images from said succession of images to said control unit.

14. The method according to claim 11, further comprising:

in case the at least one selected object is a stationary object, matching said image or piece thereof to said latest available captured image; and identifying the at least one selected object in said image or piece thereof, in order to identify the at least one selected object in the latest available captured image.

15. The method according to claim 11, further comprising selecting at least one moving object from among said one or more moving objects, based on a predetermined criterion.

16. The method according to claim 11, further comprising:

in case said selected object is not located in a field of view of said image sensor, estimating a real-time location of the selected object; and generating direction commands to said image sensor, such that said selected object is located in a real-time image of the scene generated by the image sensor.

17. The method according to claim 11, further comprising storing information with respect to said one or more objects and respective object-tags in a data-repository operatively connected to the sensing unit.

18. The method according to claim 11, further comprising:

in said control unit:

receiving a captured image from said sensing unit;

displaying said image on a display operatively connected to the control unit; and wherein said selection is made by an operator interacting with the control unit.

19. The method according to claim 11, further comprising:

executing said command with respect to the selected object notwithstanding a time-delay between a time when the sensing unit acquires the image with the selected object, to a time when a corresponding command is received at the sensing unit with respect to the selected object.

20. The method according to claim 17, further comprising:

determining that a given tagged object is no longer moving;

maintaining in the data repository information with respect to the given tagged object and a respective object-tag for a time period which is equal or greater than a communication time-delay between the sensing unit and the control unit; and discarding the information once the time period lapses.

21. A non-transitory computer storage device readable by machine, tangibly embodying a program of instructions executable by the machine to perform a method of tracking objects, the method comprising:

generating a succession of images;

identifying one or more moving objects in said succession of images;

assigning an object-tag to at least one of said moving objects to yield a respective tagged object;

sending, to a control unit, data including at least:

an image of the succession of images; and the tagged object;

tracing the tagged object, from an earlier image in said succession of images to a later image in said succession of images, thereby maintaining a given object-tag continuously associated with a respective moving object along said succession of images;

receiving a command from the control unit;

wherein the command is generated at the control unit upon receipt of input indicative of a selection of at least one object in an image received from the sensing unit;

wherein in the case the at least one selected object is a moving object, an object-tag assigned to the at least one selected object is incorporated in the generated first type of command;

in the case the at least one selected object is a stationary object, data about said image or part thereof that comprises the at least one selected object is incorporated in the generated second type of command; and wherein said command further comprises an indication whether the at least one selected object is a moving object or a stationary object;

identifying, responsive to said command, a location of the at least one selected object in a latest available captured image, the identification comprising:

determining whether the at least one selected object is a moving object or a stationary object based on said indication of said received command;

in the case the at least one selected object is a moving object:
  using the object-tag, obtained from the received first type of command, corresponding to the at least one selected object, for identifying the at least one selected object in the latest available captured image without first identifying the selected object in another previously captured image responsive to the command; and
in the case the at least one selected object is a stationary object:
  using the image or piece thereof, obtained from the received second type of command, comprising the at least one selected object, for identifying the at least one selected object in the latest available captured image.

22. A tracking system, comprising:
a sensing unit comprising an image sensor;
the sensing unit configured to:
communicate over a communication link with a control unit;
capture, with the help of the image sensor, two or more images of a scene and generate a succession of images;
identify one or more moving objects in said succession of images;
assign an object-tag to at least one of said moving objects to yield a respective tagged object;
send, to the control unit, data including at least:
  an image of the succession of images; and
  the tagged object;
trace the tagged object, from an earlier image in said succession of images to a later image in said succession of images, thereby maintaining a given object-tag continuously associated with a respective moving object along said succession of images;
receive a command from the control unit;
wherein the command is generated at the control unit upon receipt of input indicative of a selection of at least one object in an image received from the sensing unit;
  wherein in the case the at least one selected object is a moving object, an object-tag assigned to the at least one selected object is incorporated in the generated first type of command;
  in the case the at least one selected object is a stationary object, data about said image or part thereof that comprises the at least one selected object is incorporated in the generated second type of command; and
  wherein said command further comprises an indication whether the at least one selected object is a moving object or a stationary object;
responsive to said command received from said control unit indicative of at least one selected object, identify a location of the at least one selected object in a latest available captured image, the identification comprising:
  determining whether the at least one selected object is a moving object or a stationary object based on said indication of said received command;
  in the case the at least one selected object is a moving object:
    using the object-tag, obtained from the received first type of command, corresponding to the at least one selected object, for identifying the at least one selected object in the latest available captured image without first identifying the selected object in another previously captured image responsive to the command; and
  in the case the at least one selected object is a stationary object:
    using the image or piece thereof, obtained from the received second type command, comprising the at least one selected object, for identifying the at least one selected object in the latest available captured image.

23. The tracking system according to claim 1, wherein said step of tracing further comprises, in case a position of the tagged object is changed from a first position in the earlier image to a second updated position in the later image, updating a stored position of the tagged object from the first position to the second updated position, and the step of identifying a selected moving object further comprises using the received object-tag to identify the selected object based on the updated position.

24. The method according to claim 11, wherein said step of tracing further comprises, in case a position of the tagged object is changed from a first position in the earlier image to a second updated position in the later image, updating a stored position of the tagged object from the first position to the second updated position, and the step of identifying a selected moving object further comprises using the received object-tag to identify the selected object based on the updated position.

* * * * *